United States Patent
Jung

(10) Patent No.: US 10,838,553 B2
(45) Date of Patent: Nov. 17, 2020

(54) DISPLAY DEVICE WITH TOUCH SCREEN AND RELATED OPERATION METHOD INVOLVING IDENTIFYING NOISE FREQUENCY BAND SET

(71) Applicant: Samsung Display Co., Ltd., Yongin-Si (KR)

(72) Inventor: Ho Yong Jung, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/546,254

(22) Filed: Aug. 20, 2019

(65) Prior Publication Data
US 2019/0369804 A1  Dec. 5, 2019

Related U.S. Application Data

(63) Continuation of application No. 15/236,028, filed on Aug. 12, 2016, now Pat. No. 10,429,992.

(30) Foreign Application Priority Data

Nov. 23, 2015 (KR) .................. 10-2015-0163721

(51) Int. Cl.
G06F 3/041 (2006.01)
G06F 3/044 (2006.01)

(52) U.S. Cl.
CPC ............ *G06F 3/0418* (2013.01); *G06F 3/044* (2013.01); *G06F 3/0412* (2013.01); *G06F 2203/04111* (2013.01)

(58) Field of Classification Search
CPC ................. G06F 3/0418; G06F 3/0412; G06F 2203/04111
See application file for complete search history.

(56) References Cited

U.S. PATENT DOCUMENTS

| | | | |
|---|---|---|---|
| 6,124,848 A * | 9/2000 | Ballare | G06F 3/044 178/18.02 |
| 9,146,630 B2 | 9/2015 | Choi et al. | |
| 2013/0069895 A1 | 3/2013 | Lo et al. | |
| 2015/0091865 A1* | 4/2015 | Funayama | G06F 3/044 345/174 |
| 2015/0169108 A1 | 6/2015 | Ishii et al. | |
| 2015/0355783 A1 | 12/2015 | Hung et al. | |
| 2016/0170541 A1 | 6/2016 | Iwami | |

* cited by examiner

*Primary Examiner* — Kwang-Su Yang
(74) *Attorney, Agent, or Firm* — Innovation Counsel LLP

(57) ABSTRACT

A display device may include the following elements: a touch screen unit (or touch-sensing unit) operating with a preset touch driving frequency; a display unit operating with a display driving frequency corresponding to a driving control signal; a noise analyzer determining a frequency band of a panel noise based on a feedback signal provided from the display unit, wherein the panel noise is caused by operation of the display unit; and a driving frequency controller controlling the display driving frequency such that the frequency band of the panel noise avoids the touch driving frequency.

14 Claims, 6 Drawing Sheets

DISPLAY DEVICE WITH TOUCH SCREEN AND RELATED OPERATION METHOD INVOLVING IDENTIFYING NOISE FREQUENCY BAND SET

CROSS-REFERENCE TO RELATED APPLICATIONS

This application is a continuation application of U.S. patent application Ser. No. 15/236,028 filed on Aug. 12, 2016, claims priority under 35 USC § 119 to Korean Patent Application No. 10-2015-0163721, filed on Nov. 23, 2015, in the Korean Intellectual Property Office; the Korean Patent Application is incorporated herein by reference in its entirety.

BACKGROUND

1. Field

The technical field is related to a display device with a touch-sensing screen and a method of operating the display device.

2. Description of the Related Art

A touch screen panel may determine a touch position by sensing change in capacitance when a human hand or a stylus pen contacts sensing electrodes.

A display device may include a combination of a touch screen panel and a display panel. In the display device, a significant noise corresponding to change in voltage of a data signal may cause a touch error when the noise changes capacitance between the display panel and some sensing electrodes of the touch screen panel.

SUMMARY

In an embodiment, a display device may include the following elements: a touch screen unit (or touch-sensing unit) operating with a preset touch driving frequency; a display unit operating with a display driving frequency corresponding to a driving control signal; a noise analyzer determining a frequency band of a panel noise based on a feedback signal provided from the display unit, wherein the panel noise is caused by operation of the display unit; and a driving frequency controller controlling the display driving frequency such that the frequency band of the panel noise avoids the touch driving frequency.

The driving frequency controller may control the display driving frequency by generating or changing the driving control signal.

The noise analyzer may identify a frequency band corresponding to noise magnitudes exceeding a standard value as the frequency band of the panel noise. The noise analyzer may identify the frequency band of the panel noise by performing a fast Fourier transform (FFT) computation with the feedback signal as input.

The noise analyzer may determine a minimum noise frequency corresponding to a minimum noise magnitude in the frequency band of the panel noise.

The driving frequency controller may control the display driving frequency such that the minimum noise frequency coincides with the touch driving frequency.

The feedback signal may have a voltage value that is equal to a voltage value of a constant voltage supplied to the display unit.

The noise analyzer may supply noise frequency data related to the frequency band of the panel noise to the driving frequency controller.

The driving frequency controller may control the display driving frequency within a standard range and may change the display driving frequency by increments or decrements of a predetermined size if the touch driving frequency is within the frequency band of the panel noise.

The driving control signal may include a synchronization signal and a clock signal.

The touch screen unit may include first sensing electrodes, second sensing electrodes crossing the first sensing electrodes, and a touch controller driving the first sensing electrodes with the touch driving frequency.

The touch controller may include a touch driving circuit generating a touch driving signal having the touch driving frequency and supplying the touch driving signal to the first sensing electrodes and may include a touch sensing circuit sensing a touch sensing signal corresponding to the touch driving signal through the second sensing electrodes.

The display unit may include a pixel unit including a plurality of pixels coupled to scan lines and data lines, a scan driver supplying scan signal through the scan lines, a data driver supplying data signal through the data lines and a timing controller driving the scan driver and the data driver with the display driving frequency corresponding to the driving control signal.

DETAILED DESCRIPTION

Figure 1:
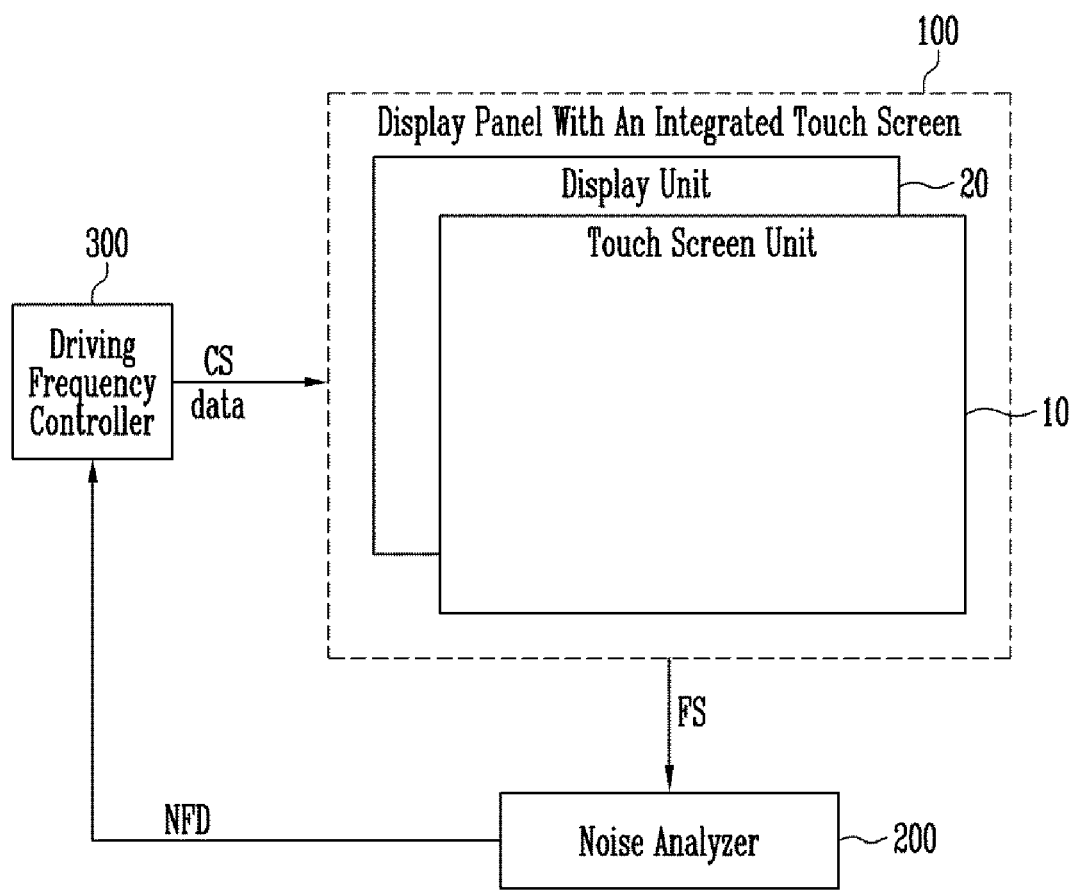
FIG. 1 schematically illustrates a display device with a touch screen according to an embodiment.

Example embodiments are described with reference to the accompanying drawings. As those skilled in the art would realize, the described embodiments may be modified in various different way. The drawings and description are to be regarded as illustrative in nature and not restrictive.

In this application, when a first element is referred to as being "on", "connected to", or "coupled to" a second element, the first element can be directly on, directly connected to, or directly coupled to the second element, or one or more intervening elements may be present. In contrast, when a first element is referred to as being "directly on", "directly connected to", or "directly coupled to" a second element, there are no intended intervening elements present between the first element and the second element. Like numbers may refer to like elements. The term "and/or" may include any and all combinations of one or more of the associated items.

In this application, although the terms first, second, etc. may be used to describe various elements, these elements should not be limited by these terms. These terms are used to distinguish one element from another element. Thus, a first element in this application could be termed a second element, and a second element could be termed a first element without departing from the teachings of the described embodiments.

Spatially relative terms, such as "beneath", "below", "lower", "above", "upper", and the like, may be used herein for ease of description to describe one element's relationship to another element as illustrated in the figures. The spatially relative terms may encompass different orientations of the device in use or operation in addition to the orientation depicted in the figures. For example, if the device in the figures is turned over, elements described as "below" or "beneath" other elements would then be oriented "above" the other elements. Thus, the term "below" can encompass both an orientation of above and below. The device may be otherwise oriented (e.g., rotated 90 degrees or at other orientations), and the spatially relative descriptors used herein interpreted accordingly.

The terminology used herein is for the purpose of describing particular embodiments and is not intended to be limiting. As used herein, the singular forms, "a", "an", and "the" are intended to include the plural forms as well, unless the context clearly indicates otherwise. The terms "includes" and/or "including" specify the presence of stated features, integers, steps, operations, elements, and/or components, but do not preclude the presence or addition of one or more other features, integers, steps, operations, elements, components, and/or groups.

Unless otherwise defined, all terms (including technical and scientific terms) used herein have the same meaning as commonly understood by one of ordinary skill in the art. Terms, such as those defined in commonly used dictionaries, should be interpreted as having a meaning that is consistent with their meaning in the context of the relevant art and will not be interpreted in an idealized or overly formal sense unless expressly so defined herein.

FIG. 1 schematically illustrates a display device with a touch screen according to an embodiment.

Referring to FIG. 1, the display device may include a display panel 100, a noise analyzer 200, and a driving frequency controller 300.

The display panel 100 may include a touch screen unit 10 and a display unit 20.

The touch screen unit 10 may sense a touch position by a human hand or a stylus pen. The touch screen unit 10 may be implemented using one or more of a resistive film method, an optical sensing method, a capacitive method, etc. The touch screen unit 10 may operate with a preset touch driving frequency. The touch screen unit 10 may include multiple sensing electrodes (not shown) and may calculate a touch position by sensing change in capacitance associated with some sensing electrodes. In order to sense the change in the capacitance associated with sensing electrodes, the touch screen unit 10 may apply a touch driving signal having a consistent touch driving frequency to the sensing electrodes. Here, the touch driving frequency may be preset to have an optimal value appropriate for touch driving according to specifications of the touch screen unit 10.

The display unit 20 may display an image based on a driving control signal CS (or driving control signal set CS) and image data (or data). The display unit 20 may operate with a display driving frequency (i.e., frame frequency or frame rate) corresponding to the driving control signal CS. Here, the display driving frequency may be defined as a vertical frequency. The vertical frequency refers to the number of frames of image that is shown in every second. For example, if the display driving frequency (or vertical frequency) is equal to 60 Hz, 60 frames are displayed in 1 second. The display driving frequency may affect the driving control signal CS and may be generated or changed by the driving frequency controller 300. The display unit 20 may be/include a liquid crystal display LCD or an organic light emitting diode display OLED, for example.

The touch screen unit 10 and the display unit 20 may overlap each other and combined with each other to form the display panel 100. In an embodiment, the touch screen unit 10 may be provided on the display unit 20. The touch screen unit 10 may be manufactured as film and may be joined on an upper substrate (not shown) of the display unit 20. In another embodiment, the touch screen unit 10 may be formed inside the display unit 20 as in-cell type. The touch screen unit 10 may be formed on a lower substrate (not shown) of the display unit 20 along with a pixel array in the display unit 20.

The noise analyzer 200 may determine a frequency band of a panel noise based on a feedback signal FS (or voltage signal FS) supplied from the display panel 100, wherein the panel noise is generated during operation of the display unit 20. A voltage value of the feedback signal FS may be substantially equal to a value of a supply voltage supplied from a constant voltage source to the display. The feedback signal FS may include a ripple component which occurs due to operation of the display unit 20. The ripple component may be a panel noise that affects operation of the touch screen unit 10. The noise analyzer 200 may determine the frequency band of the ripple component, i.e., the frequency band of the panel noise, and may generate noise frequency data NFD related to the frequency band of the panel noise.

In an embodiment, the noise analyzer 200 may perform fast Fourier transform (FFT) on the feedback signal FS to determine the frequency band of the panel noise.

The driving frequency controller 300 may configure the display driving frequency to avoid the frequency band of the panel noise. The driving frequency controller 300 may configure the display driving frequency for generating or changing the driving control signal CS. Here, the driving control signal CS (or driving control signal set CS) may include a synchronization signal and a clock signal. For example, but without limitation thereto, if the display driving frequency as determined by the driving frequency controller 300 is 60 Hz, the driving frequency controller 300 may generate a driving control signal set CS (which may include a vertical synchronization signal, a horizontal synchronization, and a clock signal) for the display unit 20 to display images with a frame rate of 60 Hz and may supply the driving control signal set CS to the display unit 20 along with the image data (or data).

The driving frequency controller 300 may recognize the frequency band of the panel noise from the noise frequency data NFD supplied substantially real-time from the noise analyzer 200. The driving frequency controller 300 may compare the preset touch driving frequency with the frequency band of the panel noise. The driving frequency controller 300 may generate a driving control signal CS based on a different display driving frequency if the touch driving frequency is within the frequency band of the panel noise. For example, if the touch driving frequency is 100 kHz, the display driving frequency is 60 Hz, and the frequency band of the panel noise is from 95 kHz to 105 kHz based on the noise frequency data NFD, the driving frequency controller 300 may change the display driving frequency from 60 Hz to 70 Hz and may generate a driving control signal CS based on the new display driving frequency of 70 Hz.

In an embodiment, the noise analyzer 200 and the driving frequency controller 300 may be included in an application processor. The application processor may control operation of the display panel 100.

Figure 2A:
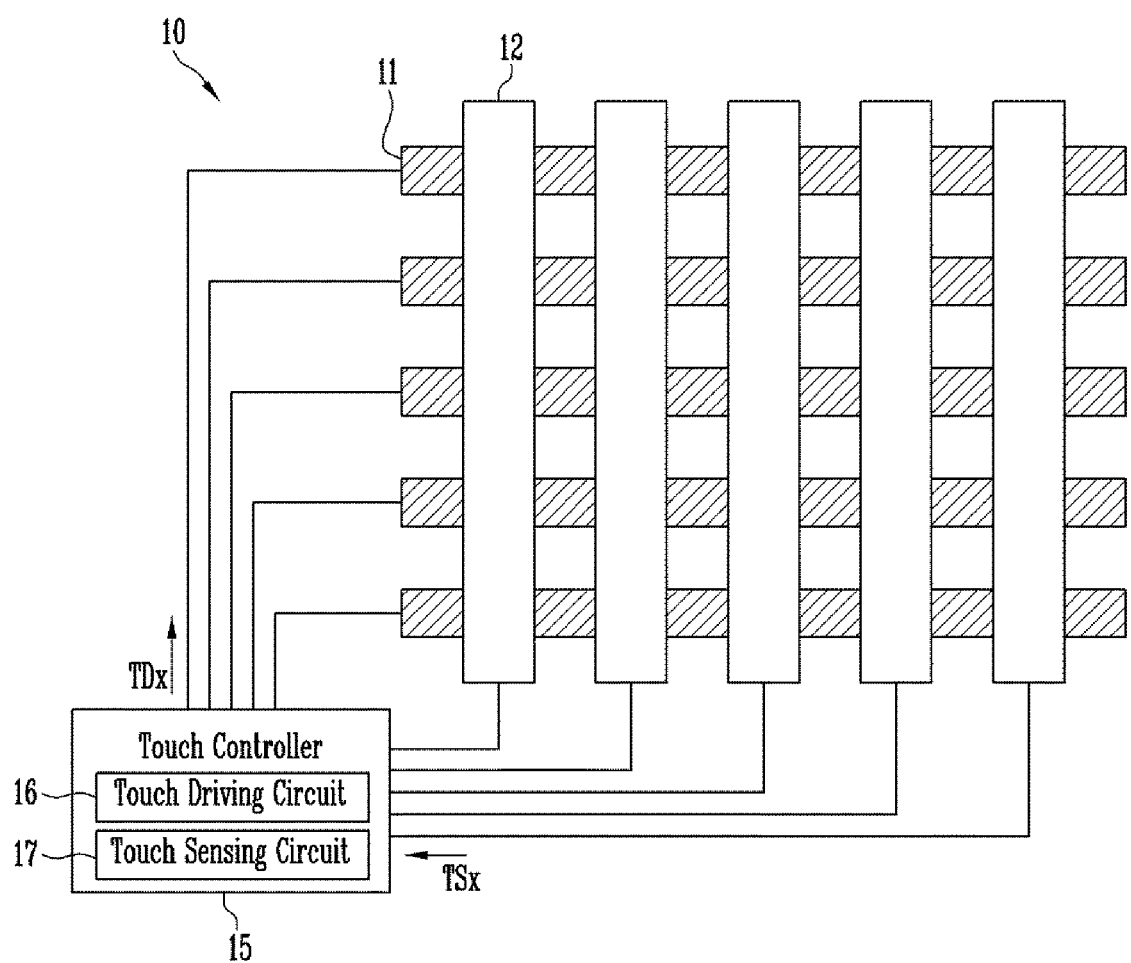
FIG. 2A is a schematic block diagram of a touch screen unit shown in FIG. 1 according to an embodiment.
Figure 2B:
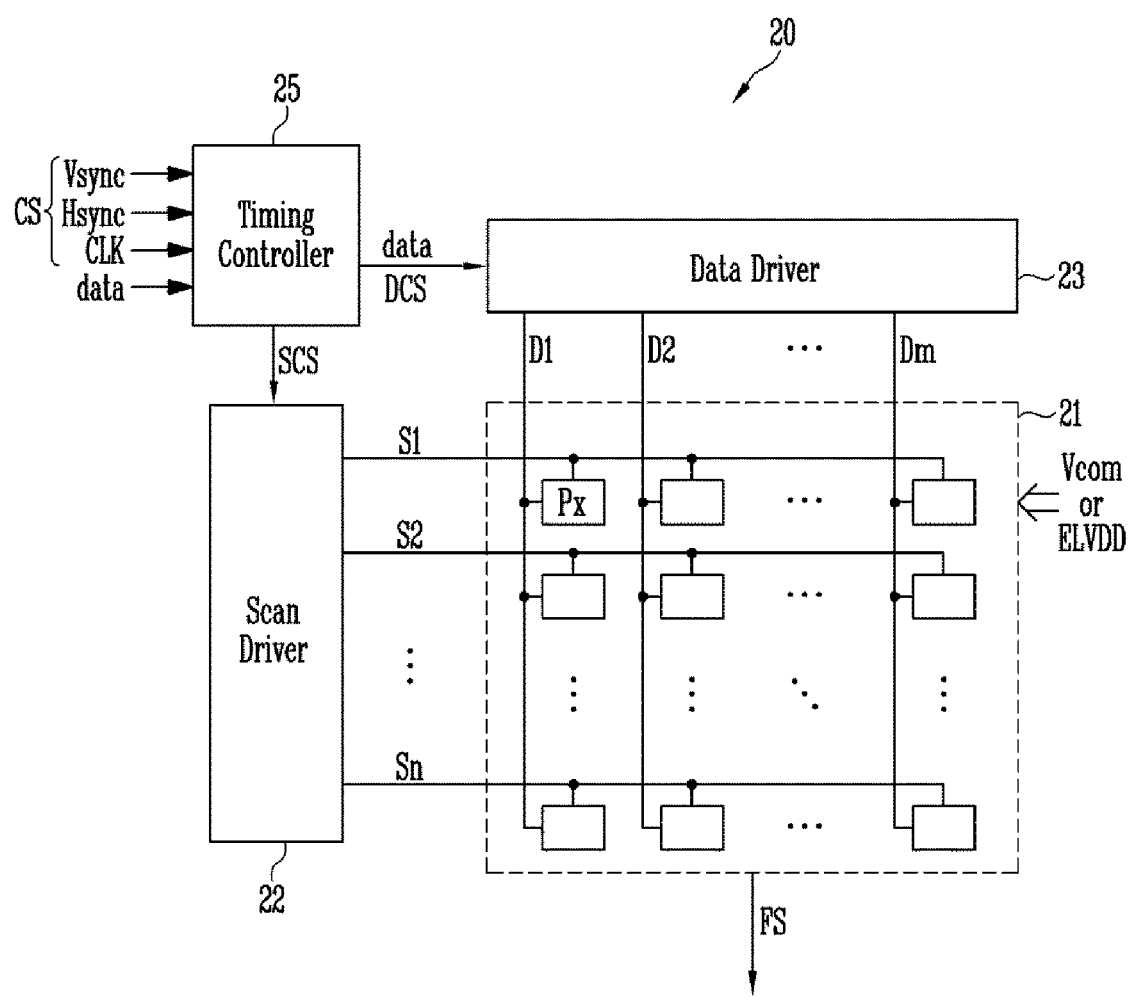
FIG. 2B is a schematic block diagram of a display unit shown in FIG. 1 according to an embodiment.

FIG. 2A is a schematic block diagram of the touch screen 10 unit shown in FIG. 1 according to an embodiment, and FIG. 2B is a schematic block diagram of the display unit 20 shown in FIG. 1 according to an embodiment.

Referring to FIG. 2A, the touch screen unit 10 according to an embodiment may include first sensing electrodes 11 and second sensing electrodes 12 crossing the first sensing electrodes 11. The first sensing electrodes 11 and the second sensing electrodes 12 may be formed on different layers or the same layer on a transparent substrate (not shown). The first sensing electrodes 11 and the second sensing electrodes 12 may be formed of transparent conductive materials. Here, the transparent conductive materials may be indium-tin-oxide (ITO), indium-zinc-oxide (IZO), carbon nano tube (CNT) or graphene, etc.

In FIG. 2A, the first sensing electrodes 11 and the second sensing electrodes 12 are shown as arranged in a shape in which the first sensing electrodes 11 are orthogonal to the second sensing electrodes 12. However, this is only one embodiment, and it may be implemented as intersecting form having a geometric configuration (concentric line and radial line of polar coordinate arrangement), etc. In FIG. 2A, the first sensing electrodes 11 and the second sensing electrodes 12 are shown in a bar shape, but this is only one embodiment, and it may be realized in a diamond form or mesh pattern, etc.

The touch screen unit 10 may include a touch controller 15 driving the first sensing electrodes 11 with the touch driving frequency. The touch controller 15 may include a touch driving circuit 16 and a touch sensing circuit 17. The touch driving circuit 16 may generate a touch driving signal TDx having a touch driving frequency and supply the touch driving signal TDx to the first sensing electrodes 11. For example, but without limitation thereto, the touch driving circuit 16 may generate the touch driving signal TDx in a pulse wave form of 100 KHz and sequentially supply the touch driving signals TDx to the first sensing electrodes 11.

The touch sensing circuit 17 may generate a touch sensing signal TSx corresponding to the touch driving signal TDx through the second sensing electrodes 12. Here, the touch sensing signal TSx may be an electrical signal related to capacitance. For example, but without limitation thereto, in a case where no touch event has occurred, the touch sensing signal TSx may have a consistent wave form according to capacitance formed between the first sensing electrodes 11 and the second sensing electrodes 12. If a touch event occurs, change in the touch sensing signal TSx occurs according to the change in the capacitance at a location where the touch occurred, and the touch sensing circuit 17 may detect it.

Referring to FIG. 2B, the display unit 20 according to an embodiment may include a pixel unit 21, a scan driver 22, a data driver 23 and a timing controller 25.

The pixel unit 21 may include a plurality of pixels Px coupled to scan lines S1 to Sn and data lines D1 to Dm. The pixels Px may receive a scan signal through the scan lines S1 to Sn, and receive a data signal through the data lines D1 to Dm. When the scan signal is supplied, the pixels Px are selected, receive a data signal and emit light having a brightness corresponding to the data signal. Pixel circuit of each of the pixels Px may have various structures that are publicly known. The description on the pixel circuit is omitted.

The pixel unit 21 may provide the feedback signal FS. Here, the feedback signal FS may be a signal corresponding to a common voltage Vcom or a power voltage ELVDD supplied to the pixel unit 21. For example, a voltage value of the feedback signal FS may be substantially equal to a voltage value of a common voltage Vcom. In a case of OLED, a voltage value of the feedback signal FS may be substantially equal to a voltage value of a power voltage ELVDD.

The scan driver 22 may be coupled to the scan lines S1 to Sn, generate scan signal in response to scan control signal SCS from the timing controller 25, and output the generated scan signal to the scan lines S1 to Sn. In an embodiment, the scan driver 22 may be configured as a plurality of stage circuits, and supply scan signal to the scan lines S1 to Sn sequentially.

The data driver 23 may be coupled to the data lines D1 to Dm, generate data signal in response to the data control signal DCS from the timing controller 25 and output the generated data signal to the data lines Dm. Here, the data driver 23 may convert the image data (or data) in a digital form provided from the timing controller 25 into a data signal (or a voltage) in an analog form. The data driver 23 which generates the data signal may supply the data signal to the data lines D1 to Dm such that it is synchronized with the scan signal.

The timing controller 25 may drive the scan driver 22 and the data driver 23 with the display driving frequency corresponding to the driving control signal set CS. Here, the driving control signal set CS may include a vertical synchronization signal Vsync, a horizontal synchronization signal Hsync and a clock signal CLK. The timing controller 25 may receive, from the driving frequency controller 300, the image data (or data), the synchronization signals Vsync and Hsync for displaying the image data (or data) as a display driving frequency and the clock signal CLK, etc. Here, the display driving frequency may correspond to a frequency of the vertical synchronization signal Vsync. The timing controller 25 may generate driving the driving control signals SCS and DCS for controlling driving of the scan driver 22 and the data driver 23 based on the synchronization signals Vsync and Hsync and the clock signal CLK.

Figure 3A:
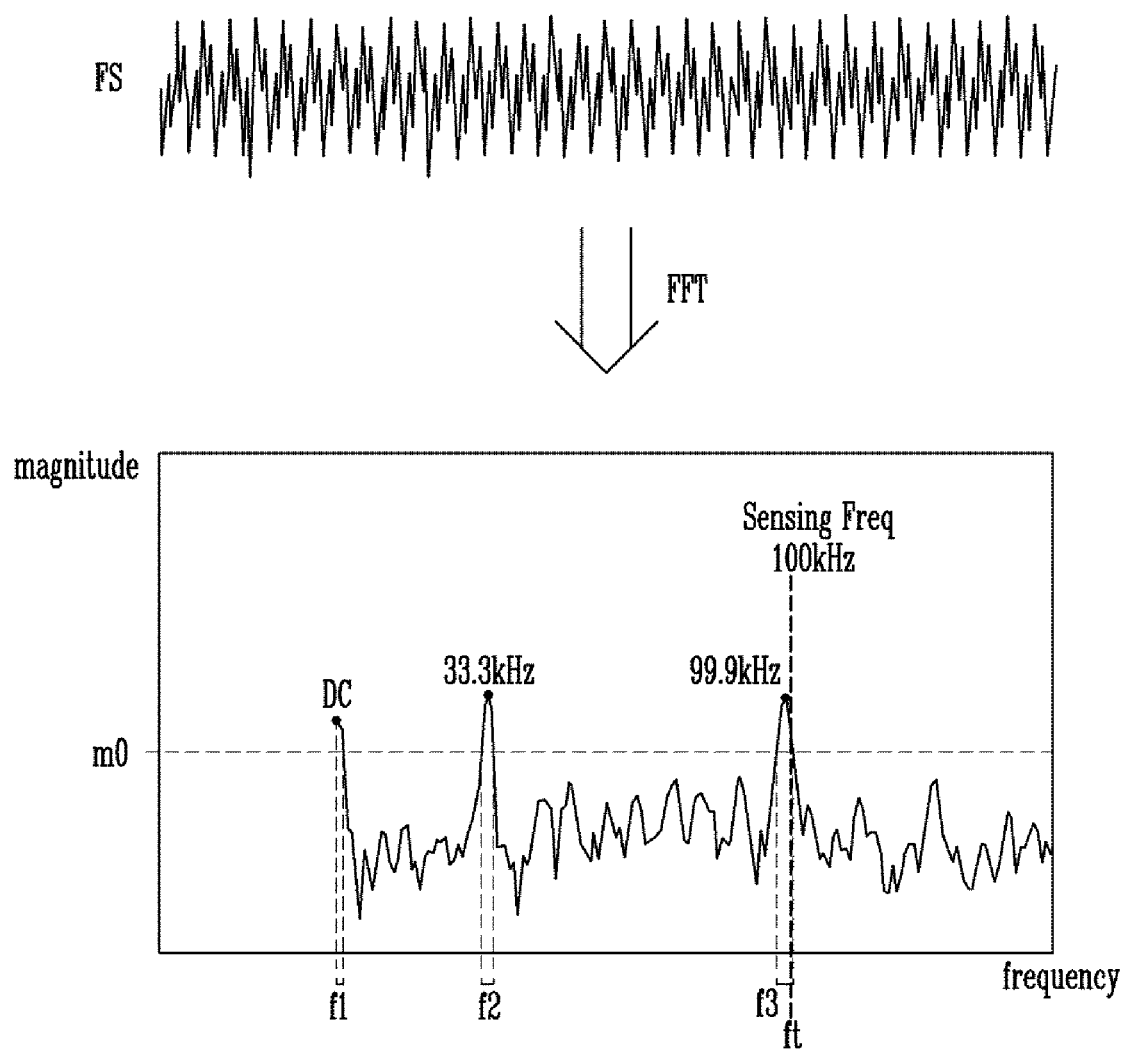
FIG. 3A, FIG. 3B, and FIG. 3C are graphs illustrating noise analysis and a method of configuring a display driving frequency according to embodiments.
Figure 3B:
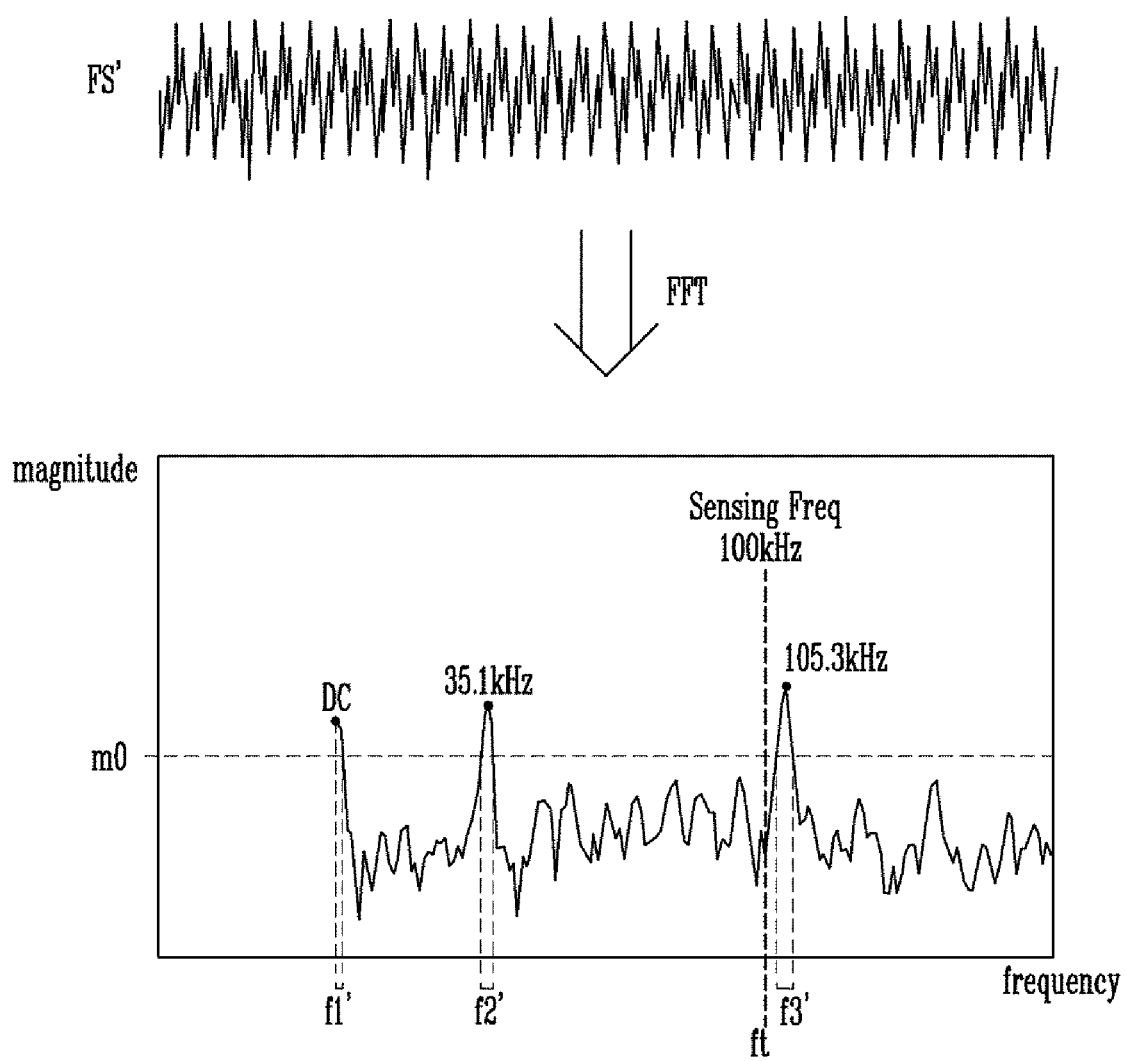
Figure 3C:
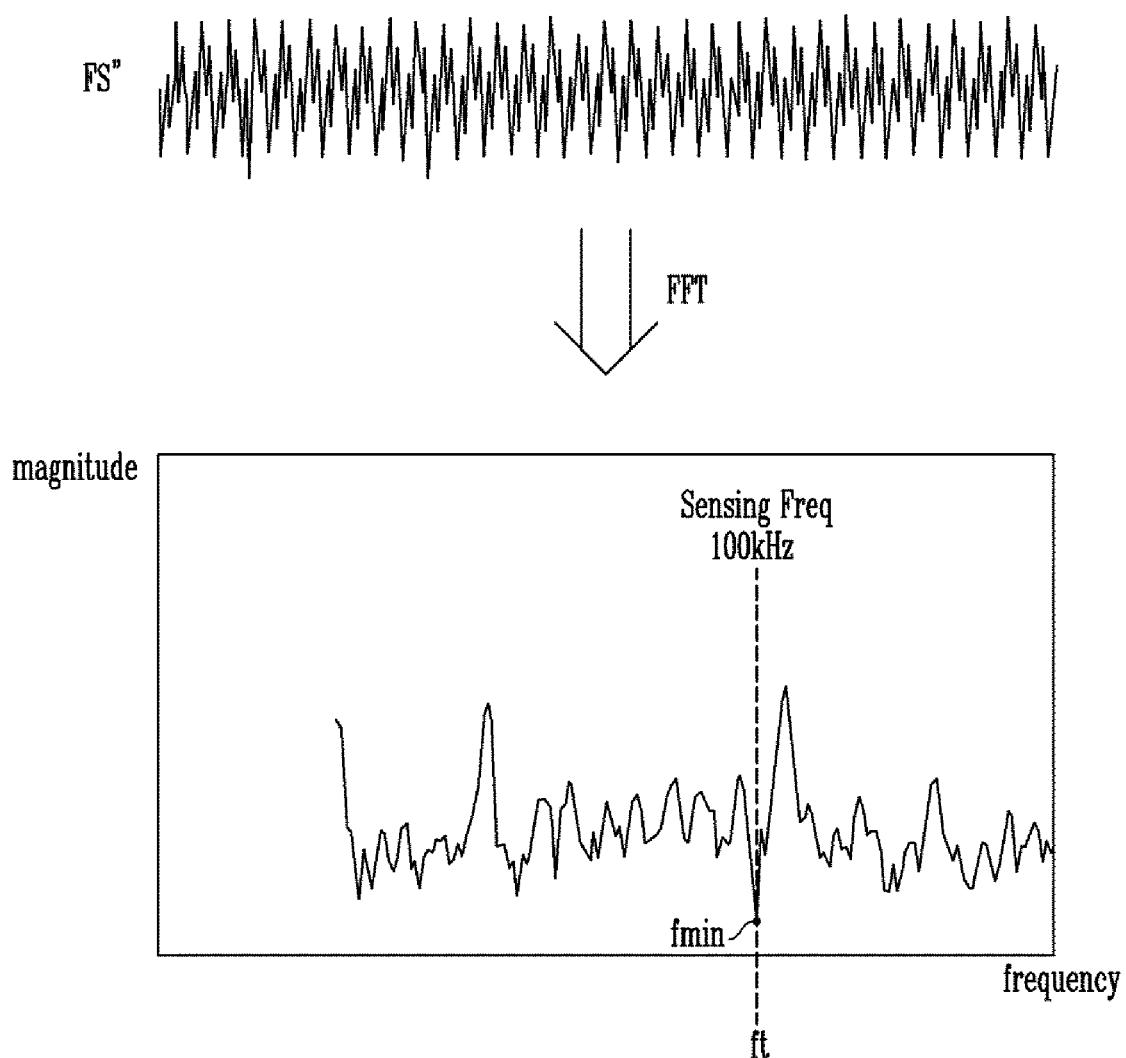

FIG. 3A, FIG. 3B and FIG. 3C are graphs illustrating noise analysis and a method of configuring a display driving frequency according to embodiments.

Referring to 3A, the feedback signal FS may include ripple component generated because of operation of the display unit 20. Such ripple component may be defined as the panel noise that may affect operation of the touch screen unit 10. The noise analyzer 200 may perform a fast Fourier transform (FFT) computation with a first feedback signal FS (or first voltage signal FS), which may be provided by the display unit 20 when the display unit 20 displays a first image, as the FFT input to compute a transform and to determine frequency bands in the transform having magnitudes that exceed the standard value m0. In the example of FIG. 3A, the frequency bands f1, f2, and f3 of the panel noise (or the transform of the panel noise) have magnitudes that exceed the standard value m0. The frequency bands f1, f2, and f3 of the panel noise may be plural frequency bands. The driving frequency controller 300 may generate or change the driving control signal CS with a different display driving frequency such that the frequency bands f1, f2, and f3 of the panel noise (with magnitudes greater than the value m0) avoid (i.e., do not overlap) the touch driving frequency ft (i.e., sensing frequency ft). That is, the touch driving frequency ft may be fixed, and the display driving frequency (i.e., frame frequency) may vary such that the touching driving frequency ft avoids the panel noise at the time of driving touch.

In an embodiment, the driving frequency controller 300 may provide a first driving control signal CS based on a first display driving frequency is 60 Hz, and the touch screen unit 10 may operate in the touch driving frequency ft is 100 kHz. The noise analyzer 200 may perform a fast Fourier transform (FFT) computation using the feedback signal FS as input to identify noise frequency bands f1, f2, and f3 corresponding to magnitudes that exceed the standard value m0. A peak point of the first noise frequency band f1 may correspond to a direct current voltage, or DC voltage. Since the voltage of the feedback signal is a constant voltage, the DC frequency is 0 Hz. The peak point of the second noise frequency band f2 may be 33.3 kHz. The peak point of the third noise frequency band f3 may be 99.9 kHz.

As a result of analysis of noise, since the touch driving frequency ft is in (i.e., overlaps) the third noise frequency band f3, the driving frequency controller 300 may set a second display driving frequency (i.e., second frame frequency) and may generate a second driving control signal CS based on the second display driving frequency. In an embodiment, the driving frequency controller 300 may configure the display driving frequency within a standard range and may change driving frequency values by a predetermined step size. For example, but the standard range of the display driving frequency may be from 60 Hz to 240 Hz. In addition, the display driving frequency may vary in increments or decrements of 3 Hz in each change, such that deterioration in picture quality potentially caused by rapid change in the display driving frequency may be avoided.

Referring to FIG. 3B, after the display driving frequency is changed to the second display driving frequency, the noise analyzer 200 and/or the driving frequency controller 300 may determine whether the noise frequency band avoided the touch driving frequency ft through analysis of a second feedback signal FS' (or second voltage signal FS'), which may be provided by the display unit 20 when the display unit 20 displays a second image. As a result of the noise analysis, if all the noise frequency bands f1', f2', and f3' with magnitudes greater than the value m0 have avoided the touch driving frequency ft, the display driving frequency may not change and may stay at the second display driving frequency. If the touch driving frequency ft is within any of the noise frequency bands f1', f2', and f3' even though the display driving frequency has been changed to the second display driving frequency, the driving frequency controller 300 may further change the display driving frequency (repeatedly) until all the noise frequency bands with magnitudes greater than the value m0 avoid the touch driving frequency ft.

In an embodiment, the driving frequency controller 300 may increase the display driving frequency from the first display driving frequency 60 Hz to a second display driving frequency 63 Hz. The driving frequency controller 300 may generate a second control signal set CS based on the second display driving frequency 63 Hz and may provide the second control signal set CS to the display unit 20. The display unit 20 may display a second image using the second control signal set and may provide a second feedback signal FS' when displaying the second image. As a result of performing a fast Fourier transform (FFT) computation with the feedback signal FS' as the input, the noise analyzer 200 may calculate noise frequency bands f1', f2' and f3' corresponding to magnitudes of at least the standard value m0. Here, the peak point of the first noise frequency band f1' may be the DC frequency 0 Hz, the peak point of the second noise frequency band f2' may be 35.1 kHz, and the peak point of the third noise frequency band f3' may be 105.3 kHz. As a result of analysis of noise, since all the noise frequency bands f1', f2' and f3' have avoided the touch driving frequency ft, the driving frequency controller 300 may maintain the display driving frequency at the second display driving frequency 63 Hz without further changing the display driving frequency.

In an embodiment, referring to FIG. 3C, the noise analyzer 200 and/or the driving frequency controller 300 may recognize (using a voltage signal provided by the display unit 20) the minimum noise frequency fmin at which magnitude of the panel noise is the smallest, and the driving frequency controller 300 may control (or adjust) the display driving frequency such that the least noise frequency fmin coincides with the touch driving frequency ft. In an embodiment, that the driving frequency controller 300 may (after some iterations) adjust the display driving frequency to a frame frequency 66 Hz. The noise analyzer 200 may calculate the minimum noise frequency fmin by performing a fast Fourier transform (FFT) computation with a feedback signal FS" as an input. As a result of analysis of the noise, since the least noise frequency fmin coincides with the touch driving frequency ft, the driving frequency controller 300 may maintain the display driving frequency at the frame frequency 66 Hz without further changing the display driving frequency.

Advantageously, the display device may reduce effect of display unit noise at the time of touch sensing, such that touch-sensing performance may be optimized.

Example embodiments have been disclosed herein. Although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Various changes in form and details may be made without departing from the spirit and scope set forth in the following claims.

What is claimed is:

1. A display device comprising:
   a touch sensor configured to operate according to a sensing frequency;
   a display unit overlapping the touch sensor, configured to display a first image using a first control signal set, and configured to provide a first voltage signal when displaying the first image; and
   a processor electrically connected to the display unit, configured to provide the first control signal set, configured to identify a first noise frequency band set using the first voltage signal, and configured to provide a second control signal set after determining that the sensing frequency is within the first noise frequency band set, wherein the display unit is configured to display a second image using the second control signal set and configured to provide a second voltage signal when displaying the second image, wherein the processor is configured to identify a second noise frequency band set using the second voltage signal, and wherein the sensing frequency is outside the second noise frequency band set.

2. The display device of claim 1, wherein noise magnitudes corresponding to the first frequency band set are equal to or greater than a predetermined value, and wherein noise magnitudes corresponding to the second frequency band set are equal to or greater than the predetermined value.

3. The display device of claim 1, wherein the display unit is configured to receive a supply voltage and configured to display the first image using the supply voltage, wherein a voltage value of the first voltage signal is equal to a voltage value of the supply voltage.

4. The display device of claim 3, wherein a voltage value of the second voltage signal is equal to the voltage value of the supply voltage.

5. The display device of claim 1, wherein the processor is configured to generate the first control signal set based on a first frame frequency, configured to set a second frame frequency after determining that the sensing frequency is within the first noise frequency band set, and configured to generate the second control signal set based on the second frame frequency, wherein the second frame frequency replaces the first frame frequency or an intermediate frame frequency that is set after the first frame frequency.

6. The display device of claim 5, wherein a difference between the first frame frequency and the second frame frequency is with a predetermined range.

7. The display device of claim 5, wherein a difference between a value of the first frame frequency and a value of the second frame frequency is equal to a first multiple of a natural number, and wherein the natural number is greater than 1.

8. The display device of claim 7, wherein the second frame frequency replaces the intermediate frame frequency, wherein a difference between the value of the first frame frequency and a value of the intermediate frame frequency is equal to a second multiple of the natural number, and wherein the first multiple of the natural number is greater than the second multiple of the natural number.

9. The display device of claim 1, wherein a noise magnitude set corresponds to the second noise frequency band set and comprises a minimum noise magnitude, wherein the minimum noise magnitude is less than all other noise magnitudes in the noise magnitude set, wherein the second noise frequency band set comprises a minimum-noise frequency, wherein the minimum-noise frequency corresponds to the minimum noise magnitude, and wherein the processor is configured to generate the second control signal set to enable a value of the minimum-noise frequency to equal to a value of the sensing frequency.

10. The display device of claim 1, wherein the processor is configured to identify the minimum-noise frequency using the second voltage signal.

11. The display device of claim 1, wherein a noise magnitude set corresponds to a third noise frequency band set and comprises a minimum noise magnitude, wherein the minimum noise magnitude is less than all other noise magnitudes in the noise magnitude set, wherein the third noise frequency band set comprises a minimum-noise frequency, wherein the minimum-noise frequency corresponds to the minimum noise magnitude, and wherein the processor is configured to generate a third control signal set to enable a value of the minimum-noise frequency to equal to a value of the sensing frequency.

12. The display device of claim 11, wherein the display unit is configured to display a third image using the third control signal set and configured to provide a third voltage signal when displaying the third image, and wherein the processor is configured to identify the third noise frequency band set and the minimum-noise frequency using the third voltage signal.

13. The display device of claim 12, wherein the display unit is configured to receive a supply voltage and configured to display each of the first image, the second image, and the third image using the supply voltage, wherein a voltage value of the third voltage signal is equal to a voltage value of the supply voltage.

14. A method of operating a display device, the method comprising:
- operating a touch sensor according to a sensing frequency;
- operating a display unit to display a first image using a first control signal set and to provide a first voltage signal when displaying the first image, wherein the display unit overlaps the touch sensor;
- providing the first control signal set from a processor to the display unit, wherein the processor is electrically connected to the display unit and comprises hardware;
- identifying a first noise frequency band set using the processor and using the first voltage signal;
- providing a second control signal set from the processor to the display unit after determining, using the processor, that the sensing frequency is within the first noise frequency band set;
- operating the display unit to display a second image using the second control signal set and to provide a second voltage signal when displaying the second image; and
- identifying a second noise frequency band set using the processor and using the second voltage signal, wherein the sensing frequency is outside the second noise frequency band set.

* * * * *